US008228786B2

(12) United States Patent
Vasseur et al.

(10) Patent No.: US 8,228,786 B2
(45) Date of Patent: Jul. 24, 2012

(54) DYNAMIC SHARED RISK NODE GROUP (SRNG) MEMBERSHIP DISCOVERY

(75) Inventors: Jean-Philippe Vasseur, Dunstable, MA (US); Jim Guichard, Groton, MA (US); Robert Raszuk, Komorow (PL)

(73) Assignee: Cisco Technology, Inc., San Jose, CA (US)

( * ) Notice: Subject to any disclaimer, the term of this patent is extended or adjusted under 35 U.S.C. 154(b) by 909 days.

(21) Appl. No.: 11/101,134

(22) Filed: Apr. 7, 2005

(65) Prior Publication Data

US 2006/0227723 A1    Oct. 12, 2006

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. ........ 370/219; 370/220; 370/227; 370/228; 370/237; 370/238; 370/243; 370/244; 370/245; 370/247; 370/248; 370/389; 370/395.5; 370/401

(58) Field of Classification Search .................... 370/254
See application file for complete search history.

(56) References Cited

U.S. PATENT DOCUMENTS

| | | | |
|---|---|---|---|
| 6,229,787 B1 * | 5/2001 | Byrne | 370/218 |
| 6,295,527 B1 | 9/2001 | McCormack et al. | |
| 6,553,423 B1 | 4/2003 | Chen | |
| 6,618,377 B1 | 9/2003 | Miriyala | |
| 6,856,591 B1 | 2/2005 | Ma | |
| 6,882,627 B2 * | 4/2005 | Pieda et al. | 370/248 |
| 7,400,611 B2 * | 7/2008 | Mukherjee et al. | 370/338 |
| 2002/0191545 A1 * | 12/2002 | Pieda et al. | 370/238 |

(Continued)

FOREIGN PATENT DOCUMENTS

EP    1 701 491 A1    9/2006

(Continued)

OTHER PUBLICATIONS

Srihari R. Sangli et al., "BGP Extended Communities Attribute", BGP, Mar. 2004.*

(Continued)

*Primary Examiner* — Faruk Hamza
*Assistant Examiner* — Cassandra Decker
(74) *Attorney, Agent, or Firm* — Cesari and McKenna, LLP (57) ABSTRACT

A technique is provided for dynamically discovering shared risk node group (SRNG) memberships of a plurality of interconnected edge devices in a computer network. According to the technique, each edge device "learns" the identities of its directly-attached peer devices situated in neighboring routing domains, e.g., by establishing an interior or exterior gateway routing protocol session with each peer. Thereafter, each edge device advertises the identities of its learned peers to the other interconnected edge devices. Preferably, the peer identities are distributed in novel "peer-router" extended community attributes transported in Border Gateway Protocol (BGP) messages. After an edge device has learned the identity of its own peers and received the identities of the other edge devices' peers, the device can automatically detect SRNG memberships in the computer network. Specifically, edge devices that advertise the same peer are determined to participate in the same SRNG.

22 Claims, 5 Drawing Sheets

U.S. PATENT DOCUMENTS

2003/0233595 A1   12/2003   Charny et al.
2005/0050225 A1*   3/2005   Tatman ......................... 709/244
2006/0164975 A1*   7/2006   Filsfils et al. ................. 370/225

FOREIGN PATENT DOCUMENTS

EP         06740325.3        2/2009

OTHER PUBLICATIONS

PCT Notification of Transmittal of the International Search Report and the Written Opinion of the International Searching Authority, or the Declaration, International Application No. PCT/US2006/012169, International Filing Date: Apr. 3, 2006, Date of Mailing: Oct. 31, 2007, 11 pages.

Kompella, K., et al., IETF Internet Draft, entitled OSPF Extensions in Support of Generalized Multi-Protocol Label Switching (draft-ietf-ccamp-ospf-gmpls-extensions-12.txt), Oct. 2003, pp. 1-12.

Kompella, K., et al., IETF Internet Draft, entitled IS-IS Extensions in Support of Generalized Multi-Protocol Label Switching (draft-ietf-isis-gmpls-extensions-19.txt), Oct. 2003, pp. 1-12.

Sangli, S., et al., IETF Internet Draft, entitled BGP Extended Communities Attribute (draft-ietf-idr-bgp-ext-communities-08.txt, Feb. 2005, pp. 1-14.

Callon, R., RFC 1195, entitled Use of OSI IS-IS for Routing in TCP/IP and Dual Environments, Dec. 1990, pp. 1-80.

Rosen, E., et al., RFC 2547, entitled BGP/MPLS VPNs, Mar. 1999, pp. 1-24.

Rekhter, Y., et al., RFC 1771, entitled A Border Gateway Protocol 4 (BGP-4), Mar. 1995, pp. 1-54.

Moy, J., RFC 2328, entitled OSPF Version 2, Apr. 1998, pp. 1-204.

Tanenbaum, A. S., Computer Networks; Fourth Edition, Section 1.4.2, Pearson Education, 2003, pp. 41-44.

Perlman, R., Interconnections Second Edition: Bridges, Routers, Switches, and Internetworking Protocols, Chapter 9, Addison Wesley Longman, Inc., pp. 189-220.

Perlman, R., Interconnections Second Edition: Bridges, Routers, Switches, and Internetworking Protocols, Chapter 12, Addison Wesley Longman, Inc., pp. 299-324.

Stephen A. T., IP Switching and Routing Essentials, Chapter 6, Wiley Computer Publishing, 2002, pp. 181-219.

\* cited by examiner

BGP TABLE 300

| PREFIX 310 | PEER-ROUTER ATTRIBUTE 320 | BGP NEXT-HOP ATTRIBUTE 330 | OTHER BGP ATTRIBUTES 340 |
|---|---|---|---|
| 10.1.1.1 | CE1 | PE1 | |
| 10.1.1.1 | CE1 | PE2 | |
| 10.1.1.1 | CE2 | PE2 | |
| ⋮ | ⋮ | ⋮ | ⋮ |

DYNAMIC SHARED RISK NODE GROUP (SRNG) MEMBERSHIP DISCOVERY

FIELD OF THE INVENTION

This invention relates generally to computer networks, and, more specifically, to a technique that enables a network node to automatically identify one or more shared risk node groups (SRNG) in a computer network.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition,* by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition,* by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are used to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1/24. In this case, the network portion of the prefix contains the 24 most-significant bits of the IP address 128.0.10.1, i.e., the network is 128.0.10.0, and the last 8 bits are used to identify hosts on that network.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system" and is often associated with a unique autonomous system (AS) number that distinguishes the AS within a larger network environment. In general, a routing domain may operate as an enterprise network, a service provider or any other type of network or subnetwork. Further, the routing domain may contain one or more edge devices (e.g., border routers) having "peer" connections to other edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks (address prefixes) among the intermediate nodes in the routing domain. As such, each intermediate node receives a consistent "view" of the domain's topology. Link-state protocols, such as the Open Shortest Path First (OSPF) and Intermediate-System-to-Intermediate-System (IS-IS) protocols, and distance-vector protocols, such as the Routing Information Protocol (RIP), are generally described in Sections 12.1-12.3 of the reference book entitled *Interconnections, Second Edition,* by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4 (BGP-4),* by Y. Rekhter et al., published March 1995, which is publicly available through the Internet Engineering Task Force (IETF) and is hereby incorporated by reference in its entirety. External BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. To implement iBGP, the edge devices must be "fully meshed," i.e., such that every device is coupled to every other device by way of a TCP connection. In practice, conventional route reflectors are used to logically couple devices into a full mesh.

BGP-enabled edge devices perform various routing functions, including transmitting and receiving BGP messages and rendering routing decisions based on BGP routing policies. Each edge device maintains a local BGP routing table that lists feasible routes to reachable (i.e., accessible) network nodes. In the context of BGP, a "route" is defined as an address prefix and its associated path attributes. Periodic refreshing of the BGP routing table is generally not performed. However, the BGP-configured edge devices do exchange routing information under certain circumstances.

For example, when a BGP-enabled edge device initially connects to the network, the device identifies its directly-attached peers in neighboring ASes and then receives the entire contents of its peers' BGP routing tables. Thereafter, routing updates are incrementally disseminated among the interconnected BGP-enabled edge devices so that each device can construct a consistent view of the network topology. To that end, BGP update messages are typically used to advertise a list of address prefixes whose reachability information has changed in the BGP routing table. The BGP update message also may include one or more BGP attributes associated with the advertised prefixes. Conventional BGP attributes and their formats are generally well known and are described in more detail in Chapter 6 of the reference book entitled *IP Switching and Routing Essentials*, by Stephen A. Thomas, published 2002 which is hereby incorporated by reference in its entirety.

The concept of shared risk link groups (SRLG) has been introduced to reflect that failure of a single data link can result in failures at one or more other links. For instance, when different inter-domain data links share a common resource, such as an optical fiber or the like, they are said to participate in the same SRLG. That is, failure of the shared resource would result in the failures of each of the links whose data packets are transported using that shared resource. Similarly, when multiple edge devices in a first routing domain are attached to a common edge device in a second routing domain, the set of edge devices in the first domain may be members of the same shared risk node group (SRNG). In this case, a network failure at the common edge device would prevent each device in the SRNG from communicating with the failed edge device in the second domain.

SRLG membership information may be communicated among a set of fully-meshed edge devices using standardized extensions to conventional interior gateway routing protocols, such the OSPF and IS-IS protocols. In practice, a link is manually assigned, e.g., by a network administrator, to one or more SRLGs. The link is then associated with a different SRLG identifier for each of its assigned SRLGs. These identifiers are typically stored along with an identifier of the link in a type-length-value (TLV) tuple. Thereafter, the TLV is advertised within a routing domain to disseminate the link's SRLG information. For instance, SRLG TLVs for OSPF and IS-IS advertisements are respectively described in the IETF Internet Drafts draft-ietf-ccamp-ospf-gmpls-extensions-12.txt, entitled *OSPF Extensions in Support of Generalized Multi-Protocol Label Switching*, dated October 2003, by Kompella et al. and draft-ietf-isis-gmpls-extensions-19.txt, entitled *IS-IS Extensions in Support of Generalized Multi-Protocol Label Switching*, dated October 2003, by Kompella et al., both of which are hereby incorporated by reference as though fully set forth herein.

Although manual configuration of SRNG memberships also can be performed, such static SRNG configuration is impractical. For instance, manual SRNG configuration is excessively time consuming, since it requires a network administrator to examine each edge device in a routing domain to determine the device's directly-attached peers. Because the administrator may have to keep track of a large number of edge devices and complex network topologies, manual SRNG configuration can result in erroneous or accidental SRNG assignments. The above-noted problems are often compounded in response to changes in the network topology which necessitate updated SRNG assignments. For instance, if a link or node is added or removed at the edge of the routing domain, the network administrator may have to re-configure the SRNG memberships at least at those edge devices affected by the topology change.

It is therefore generally desirable to assign SRNG memberships to edge devices in a more efficient manner. The process of assigning SRNG memberships should be less time consuming and more reliable than manual configuration techniques, and the process should update SRNG memberships faster in response to network topology changes.

SUMMARY OF THE INVENTION

The present invention overcomes the disadvantages of the prior art by providing a technique for dynamically discovering SRNG memberships of a plurality of interconnected edge devices in a computer network. According to the technique, each edge device "learns" the identities of its directly-attached peer devices situated in neighboring routing domains, e.g., by establishing an interior or exterior gateway protocol session with each peer. Thereafter, each edge device advertises the identities of its learned peers to the other interconnected edge devices. Preferably, the peer identities are distributed in novel "peer-router" extended community attributes transported in BGP messages. After an edge device has learned the identity of its own peers and received the identities of the other edge devices' peers, the device can automatically detect SRNG memberships in the computer network. Specifically, edge devices that advertise the same peer are determined to participate in the same SRNG.

Advantageously, the inventive technique enables faster and more efficient identification of SRNG memberships than static configuration implementations. The technique also enables SRNG memberships to be updated faster and more efficiently in response to network topology changes.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

discovery technique of the present invention may be employed in other network topologies as well.

DETAILED DESCRIPTION OF ILLUSTRATIVE EMBODIMENTS

Figure 1:
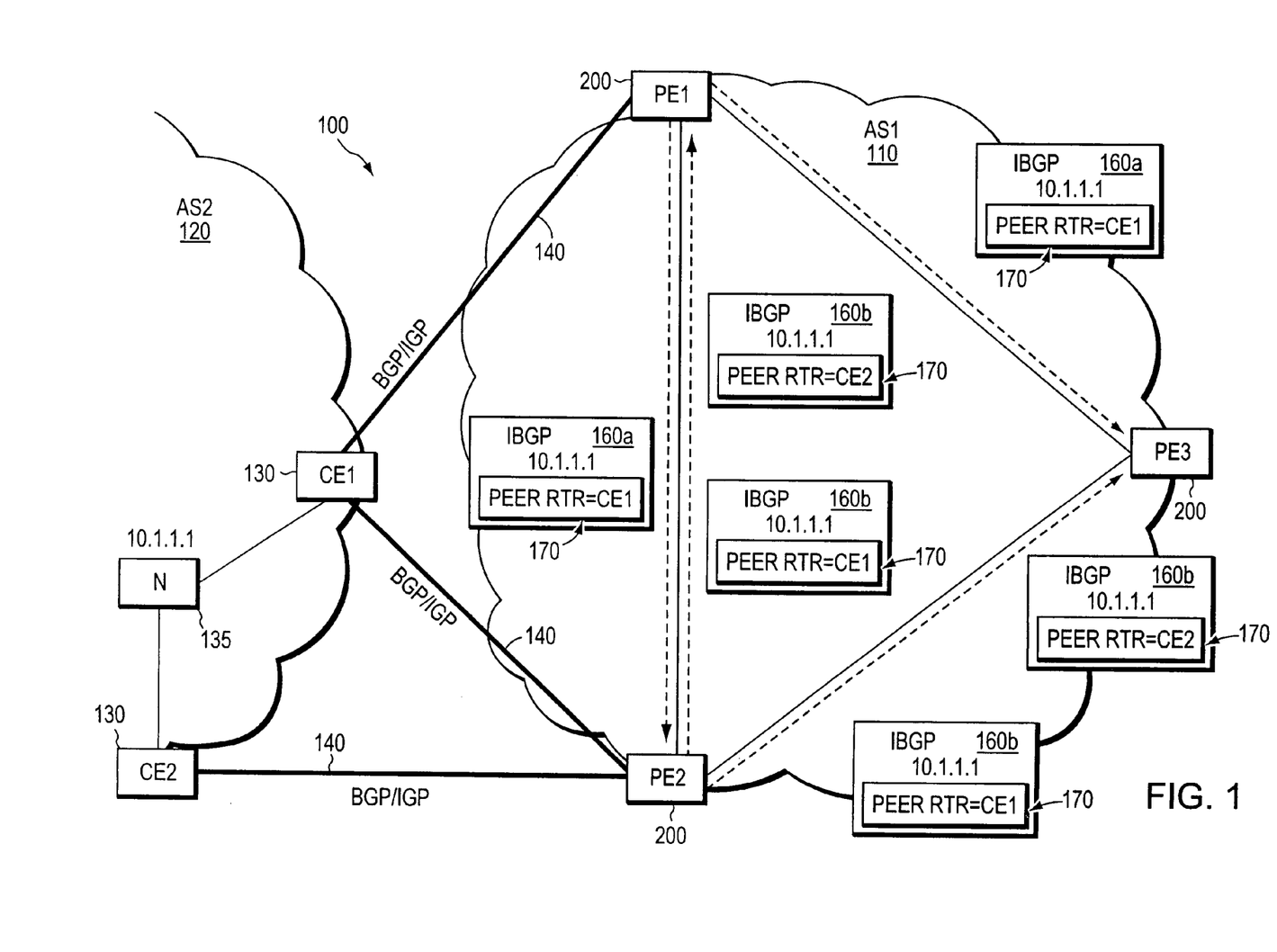
FIG. 1 is a schematic block diagram of an exemplary computer network that may be used in accordance with the illustrative embodiments. Those skilled in the art will appreciate that the network topology of FIG. 1 is merely representative and that the dynamic node-shared risk node group (SRNG)

FIG. 1 illustrates an exemplary computer network 100 including a service provider network 110 (AS1) coupled to a neighboring customer site 120 (AS2). The provider network is preferably managed as BGP or Multi-Protocol Label Switching (MPLS) virtual private network (VPN) network, as generally described in the IETF publication RFC 2547, entitled *BGP/MPLS VPNs*, by E. Rosen et al., published March 1999, which publication is hereby incorporated by reference as though fully set forth herein. Data packets are forwarded between nodes in the provider network 110 using, e.g., the IP and/or MPLS protocols, and routing information is exchanged among the intermediate network nodes using an interior gateway routing protocol (IGP), such as OSPF or IS-IS.

The provider network 110 includes a plurality of provider edge (PE) devices 200, such as the edge devices PE1, PE2 and PE3. The PE devices are fully meshed at the BGP level. That is, each PE device in the provider network can communicate with every other PE device via iBGP (either directly, by means of BGP route reflectors or via use of confederations). The customer site 120 contains one or more customer edge (CE) devices 130 that communicate with the PE devices 200 over PE-CE data links 140. For example, as shown, the customer edge device CE1 is coupled to the provider edge devices PE1 and PE2, and the customer edge device CE2 is coupled to the provider edge device PE2. The PE and CE devices are generally intermediate network nodes, such as routers or switches, located at the edge of their respective networks.

The PE-CE data links 140 may be established over various physical mediums, such as conventional wire links, optical links, wireless links, etc., and may communicate data formatted using various network communication protocols including Asynchronous Transfer Mode (ATM), Frame Relay, Ethernet, Fibre Distributed Data Interface (FDDI), etc. In addition, the PE and CE devices may be configured to exchange routing information over their respective PE-CE data links using various interior and exterior gateway protocols, such as BGP, OSPF, IS-IS, etc.

In accordance with the illustrative embodiments, each PE device 200 dynamically "learns" the identities of its neighboring ("peer") CE devices 130. To that end, each pair of neighboring PE and CE devices typically establishes a reliable, stateful communication session, such as a TCP session, over its corresponding PE-CE data link 140. Routing information is then exchanged over the PE-CE link using, e.g., BGP or an appropriate IGP routing protocol. The choice of which routing protocol to deploy over the PE-CE data link may be locally determined by the pair of PE and CE devices attached to the link. Alternatively, the inter-domain routing protocol may be predetermined by, e.g., the network administrators of the provider network 110 and the customer site 120.

As is typical, after a BGP or IGP session has been established over a PE-CE data link, the CE device 130 attached to the link advertises its identity to the PE device 200 at the other end of the link. For instance, the CE device may communicate its identity in a "BGP Identifier" field of a BGP Open message sent to the PE device. When an IGP protocol is deployed over the PE-CE data link, an IGP Hello packet, such as a conventional OSPF or IS-IS Hello packet, may include a "Router ID" field or TLV containing the CE device's identity. The formats of BGP Open and IGP Hello messages are well known in the art and are described in more detail in the above-incorporated RFC 1771, and in the RFC 2328, entitled OSPF Version 2, by J. Moy, published April 1998, and in the RFC 1195, entitled *Use of OSI IS-IS for Routing in TCP/IP and Dual Environments*, by R. Callon, published December 1990, all of which are hereby incorporated by reference as though full set forth herein. Of course, besides the illustrative PE-CE routing protocols noted above, the teachings of the present invention are also applicable when other interior and exterior routing protocols, such as RIP or the Enhanced Interior Gateway Routing Protocol (EIGRP), etc., are executed over the PE-CE data links 140.

A CE device preferably identifies itself to an attached PE device using at least one of its assigned IP addresses, although those skilled in the art will understand that other identifying values also may be used. However, in accordance with the illustrative embodiments, each CE device advertises the same identifying value to each of its attached PE devices 200 in the provider network 110, even if the CE device communicates with two or more of its attached PE devices using different inter-domain routing protocols. For instance, in FIG. 1, CE 1 sends the same CE-device identifier to both PE1 and PE2, even if CE1 is configured to communicate routing information over the PE1-CE1 data link using BGP and over the PE2-CE1 data link using an IGP protocol, such as OSPF.

After a PE device 200 learns the identities of its directly-attached CE devices 130, i.e., those CE devices that establish communication sessions directly with the PE device, the PE device advertises its learned CE-device identities to each of the other fully-meshed PE devices in the provider network 110. Specifically, the PE device generates an advertisement, such as an iBGP message 160, that associates a set of network layer reachability information (i.e., one or more address prefixes) with a corresponding CE device 130. Illustratively, each iBGP message 160 includes one or more prefixes and a "peer-router" extended community attribute 170 that identifies a CE device through which the prefixes can be reached. In general, the peer-router attribute may be formatted as a BGP extended community attribute, which is described in more detail in the IETF Internet Draft draft-ietf-idr-bgp-ext-communities-08.txt, entitled *BGP Extended Communities Attribute*, dated February 2005, by Sangli et al., which is hereby incorporated by reference in its entirety.

When a PE device 200 receives an iBGP message 160 from another one of the fully-meshed PE devices, the receiving PE device analyzes the message to locate any peer-router attributes 170 contained therein. Then, the PE device locates the CE-device identifiers stored in the received peer-router attributes and associates the CE identifiers with the set of address prefixes advertised in the iBGP message. For example, in the exemplary network 100, the customer edge devices CE1 and CE2 are attached to a network node N 135 whose network address is 10.1.1.1. Accordingly, CE1 and CE2 advertise the prefix 10.1.1.1 to each of their directly-attached provider edge devices. For instance, CE1 advertises the prefix to PE1 and PE2, and CE2 advertises the prefix to PE2.

After receiving the prefix from a neighboring CE device, a PE device 200 associates the received prefix with a CE identifier corresponding to the CE device 130 that advertised the prefix. The prefix and CE identifier are then disseminated within the provider network 110 to the other fully-meshed PE devices. For instance, PE1 disseminates iBGP messages 160a containing the address prefix 10.1.1.1 and a corresponding peerrouter attribute 170 that identifies the customer edge device CE1. Similarly, PE2 propagates two different iBGP messages 160b containing the address prefix 10.1.1.1—one iBGP message 160b containing a peer-router attribute 170 identifying CE1, and another having a peer-router attribute identifying CE2. Each iBGP message 160 also includes a conventional BGP "next hop" attribute that identifies the sending PE device as a next-hop destination for traffic addressed to the prefix 10.1.1.1. For instance, each iBGP messages 160a includes a BGP next-hop attribute identifying PE1, whereas the BGP next-hop attributes in the iBGP messages 160b identify PE2.

After having learned the identity of its own peer CE devices and received the identities of each of the other PE devices' peers, e.g., from received peer-router and next-hop attributes, a PE device can automatically detect SRNG memberships in the provider network 110. Specifically, PE devices attached to the same CE device are determined to participate in the same SRNG. Because each PE device 200 advertises the identities of its peer CE devices to each of the other the fully-meshed PE devices, the PE devices 200 dynamically discover consistent sets of SRNG memberships.

Figure 2:
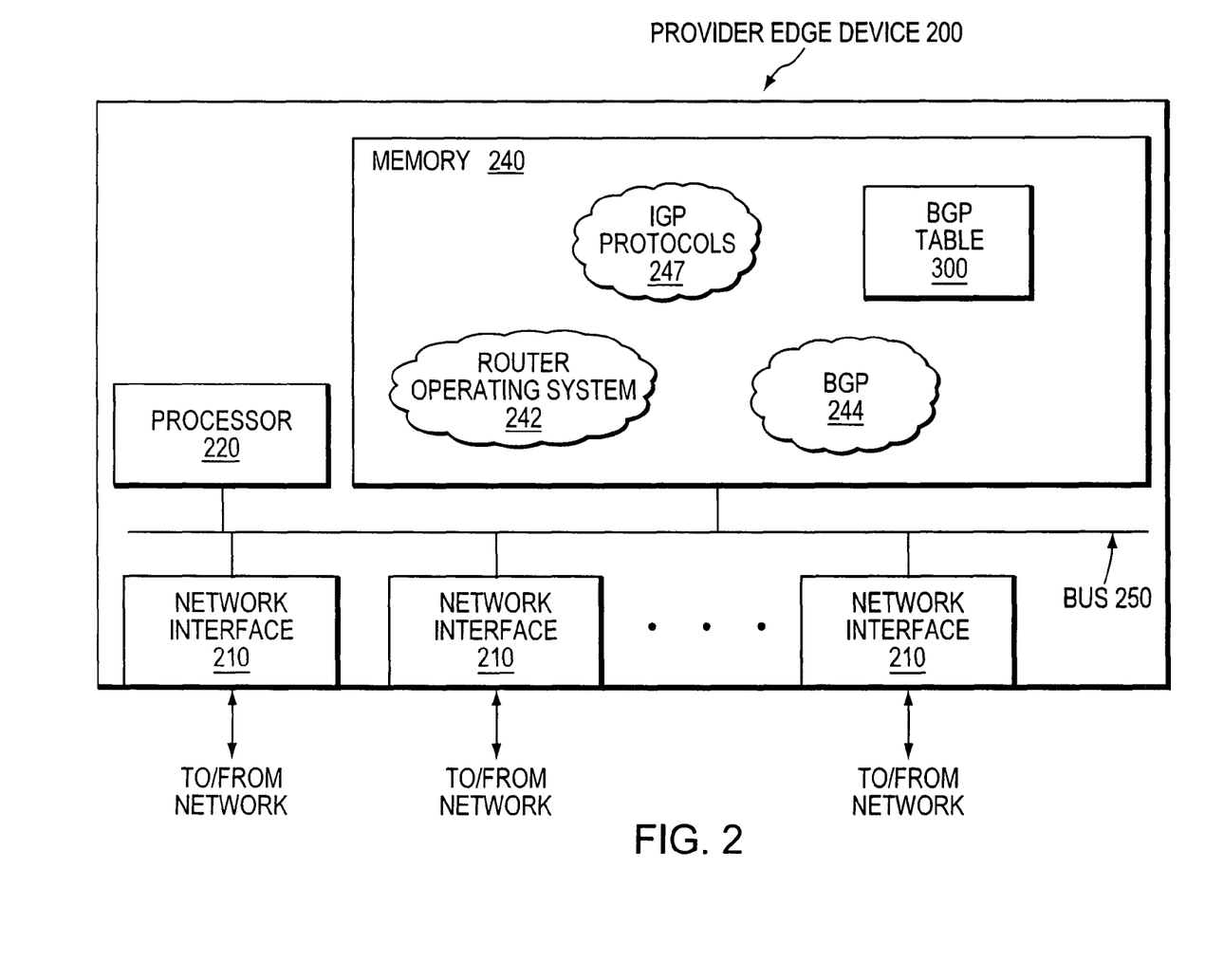
FIG. 2 is a schematic block diagram of a provider edge (PE) device which may implement the dynamic SRNG discovery technique in accordance with the illustrative embodiments.

FIG. 2 is a schematic block diagram of an exemplary PE device 200, such as a router, that may be advantageously used with the present invention. For ease of illustration and description, the PE device 200 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 200 is merely exemplary and that the advantages of the present invention may be realized on a variety of different hardware platforms having various software capabilities.

The PE device 200 comprises a plurality of network interfaces 210, a processor 220, and a memory 240 interconnected by a system bus 250. The network interfaces 210 contain the mechanical, electrical and signaling logic and circuitry for communicating data over physical links coupled to the network 100. The network interfaces may be configured to transmit and/or receive data using a variety of different communication protocols, including, inter alia, TCP/IP, ATM, User Datagram Protocol (UDP), synchronous optical networks (SONET), synchronous digital hierarchy (SDH), wireless protocols, Frame Relay, Ethernet, Fiber Distributed Data Interface (FDDI), etc.

The memory 240 comprises a plurality of storage locations, which are addressable by the processor 220 and the network interfaces 210, and are adapted to store program code and data structures associated with the present invention. The processor 220 comprises circuitry and logic adapted to execute the program code and manipulate the data structures. The memory 240 preferably comprises a form of random access memory (RAM) that is generally cleared by a power cycle or other reboot operation (e.g., it is a "volatile" memory). It will be apparent to those skilled in the art that the memory 240 also may comprise other memory means, including various computer-readable media, for storing program instructions and data structures pertaining to the operation of the PE device 200. Further, those skilled in the art will appreciate that at least some portions of the memory 240 may be embodied as electromagnetic signals that are transmitted from a remote memory element to the PE device 200.

The memory 240 stores, among other things, computer-readable instructions for implementing a routing operating system 242 that functionally organizes the PE device 200 by, inter alia, invoking network operations in support of software processes and services executing in the PE device 200. The IOSTM operating system by Cisco Systems Incorporated is one example of such a routing operating system 242. The software processes and services supported by the routing operating system include IGP protocols 247 and a BGP process 244.

The IGP protocols 247 include computer-executable instructions that enable the processor 220 to implement functions provided by one or more routing protocols, such as OSPF and IS-IS. These protocols may be configured to manage routing and forwarding information databases (not shown) containing, e.g., data used to make routing and forwarding decisions. The BGP process 244 includes computer-executable instructions for executing the BGP protocol, i.e., IBGP and/or eBGP. The BGP process manages the contents of a BGP routing table 300 which lists feasible routes to reachable (i.e., accessible) network nodes. In the context of BGP, a "route" is defined as an address prefix and its associated path attributes.

Figure 3:
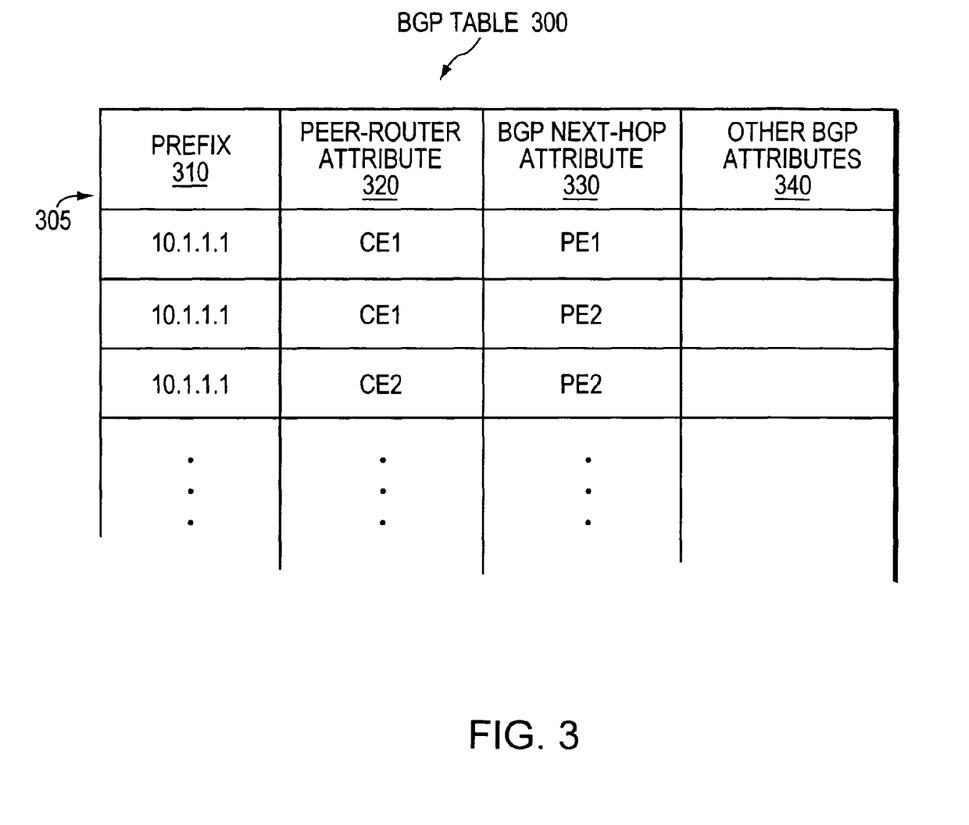
FIG. 3 is a schematic block diagram of a BGP table that may store SRNG membership information in accordance with the illustrative embodiments.

FIG. 3 illustrates an exemplary BGP table 300 that may be stored in the memory 240. Each table entry 305 contains an address prefix 310, a peer-router attribute 320, a BGP next-hop attribute 330 and other BGP attributes 340. The address prefix 310 may be, e.g., an IPv4 or VPNv4 address prefix that is reachable to the PE device 200. The peer-router attribute 320 identifies a CE device associated with the prefix 310. The BGP next-hop attribute 330 identifies a PE device that may be used as a next hop to reach the CE device identified by the peer-router attribute 320. Accordingly, a SRNG can be identified in the table 300 when a prefix 310 is associated with the same CE device 320 but different PE devices 330. The other BGP attributes 340 may include other BGP path attributes, such as the BGP origin attribute, AS_path attribute, local_pref attribute, etc., as conventionally known in the art.

Operationally, an iBGP message 160 containing network layer reachability information (nlri) and a corresponding peer-router attribute 170 is received at a network interface 210 of the PE device 200. The message is passed to the BGP process 244 which locates a CE identifier in the received peer-router attribute 170, and also locates a PE identifier in the message's next-hop attribute. For each address prefix advertised in the received nlri, the BGP process respectively stores the received CE and PE identifiers as the peer-router attribute 320 and BGP next-hop attribute 330 in the prefix's table entry 305. SRNGs may be identified by traversing the BGP table entries 305 and locating groups of PE devices associated with the same prefix 310 and CE device 320. For instance, in the exemplary BGP table 300, PE1 and PE2 are members of the same SRNG since they both are BGP next-hops for the prefix 10.1.1.1. advertised by the customer edge device CE1.

Figure 4:
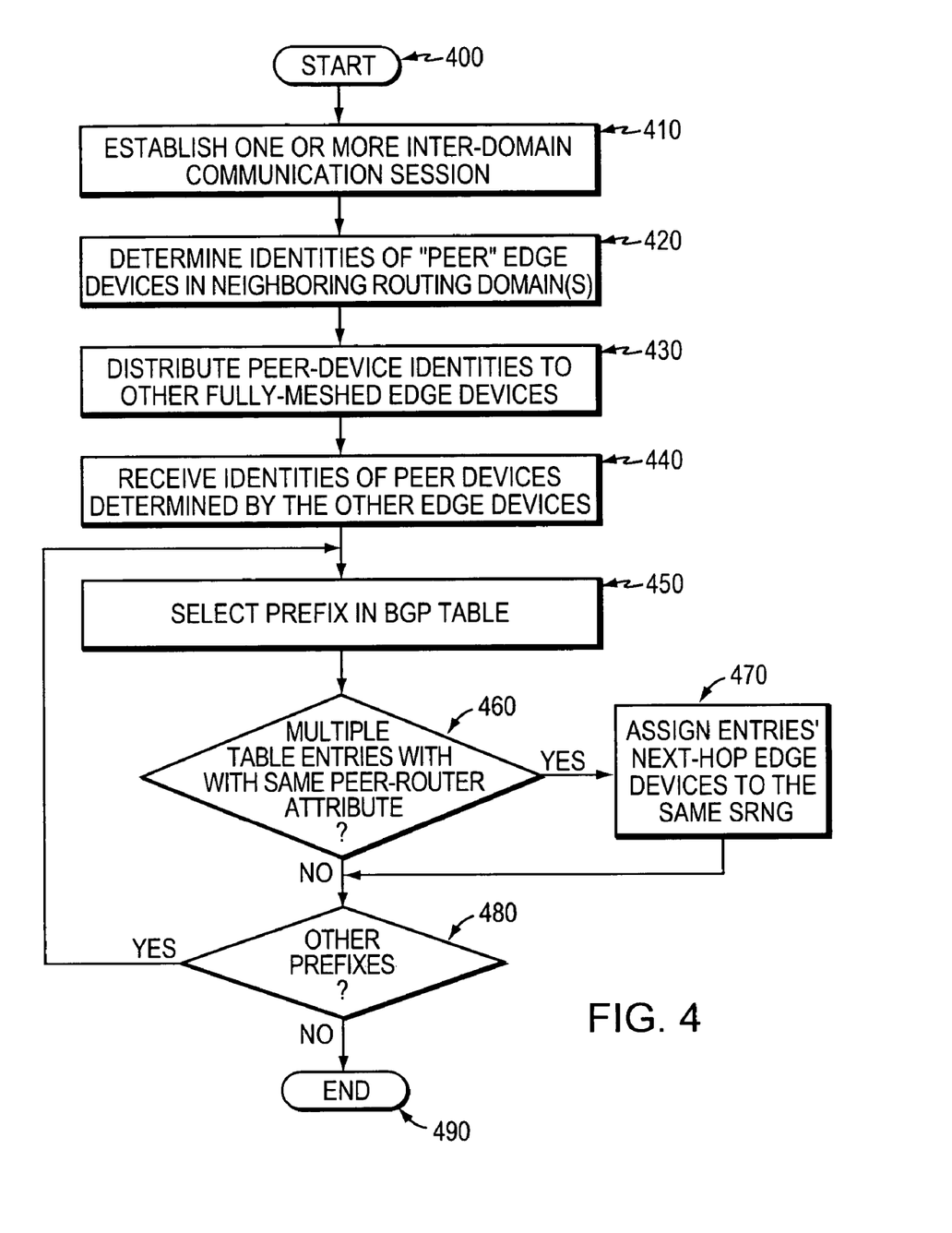
FIG. 4 is a flowchart illustrating a sequence of steps for dynamically identifying SRNG memberships in accordance with the illustrative embodiments.

FIG. 4 illustrates a sequence of steps that may be performed by a PE device 200 that dynamically discovers SRNG memberships in accordance with the illustrative embodiments. The sequence starts at step 400 and proceeds to step 410 where the PE device establishes one or more inter-domain communication sessions, e.g., BGP or IGP sessions, with its directly-attached "peer" CE devices 130. At step 420, the PE device determines the identities of its peer CE devices, e.g., based on the contents of BGP Open messages or IGP Hello messages received from the peers. Then, at step 430, the PE device distributes the identities of its peer CE devices to the other fully-meshed PE devices in the provider network 110. To that end, the CE device identities may be advertised to the other PE devices in one or more iBGP messages 160, each iBGP message containing a peer-router extended community attribute 170 storing a CE device identity and a BGP next-hop attribute identifying the PE device.

At step 440, the PE device 200 receives the identities of the CE devices coupled to the other PE devices. That is, the PE device may receive iBGP messages 160 advertised from the other fully-meshed PE devices, and may extract CE identifiers from peer-router attributes 170 included in the received iBGP messages. Illustratively, the PE device stores its locally-determined CE-device identifiers as well as the CE-device identifiers received from the other PE devices in a BGP table 300. As noted, each entry 305 in the BGP table associates a reachable address prefix 310 with a CE device 320 that advertised the prefix and with a PE device 330 attached to the advertising CE device 320.

Next, at steps 450-480, the PE device "walks" the BGP table 300 to automatically detect SRNG memberships. First, at step 450, an address prefix 310 is selected in the BGP table 300. Table entries 305 containing the selected prefix are examined, at step 460, to determine whether multiple table entries containing the prefix also store the same peer-router attribute 320. If so, then at step 470, edge devices identified by the entries' next-hop attributes 330 are determined to belong to the same SRNG. At step 480, the BGP table is examined to determine whether it contains any other reachable prefixes. If it does, the sequence returns to step 450. Otherwise, the sequence ends at step 490.

The dynamic SRNG discovery technique may be employed in a variety of different applications. In one illustrative application, a PE device may automatically detect SRNG memberships in order to provide optimal load-balancing of network traffic addressed to the same customer site. For example, consider the network topology of FIG. 5 in which a computer network 500 includes a provider network 510 (AS1) coupled to a neighboring customer site 520 (AS2). The provider edge device PE4 may be configured to forward network traffic to a destination N in the customer site 520. In this exemplary topology, the destination N is reachable through both the customer edge devices CE1 and CE2. PE4 can forward network traffic to CE1 through either PE1 or PE2, or PE4 can direct traffic to CE2 via PE3. Accordingly, PE4 has three possible routes to forward data addressed to the destination N.

Figure 5:
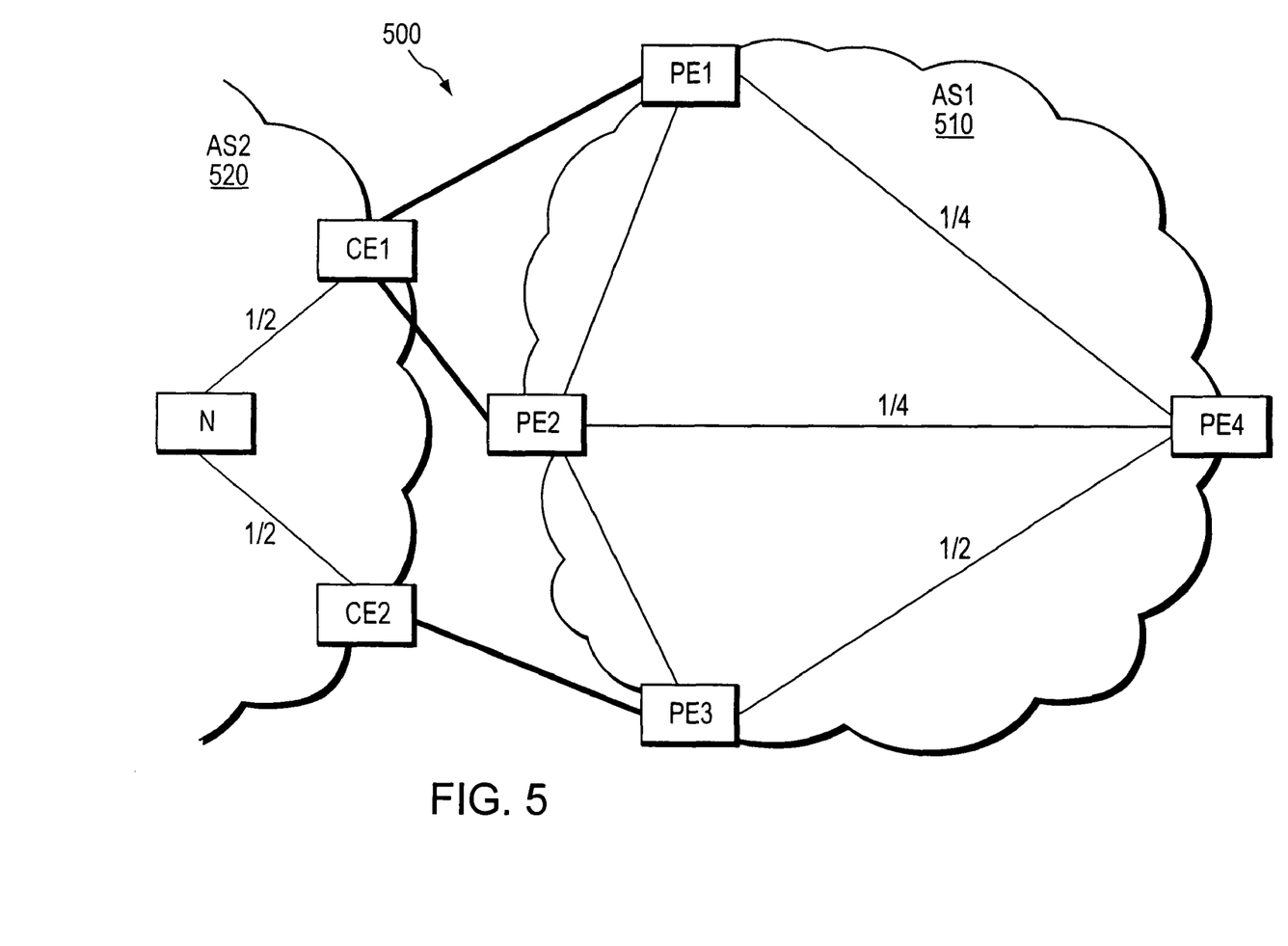
FIG. 5 is a schematic block diagram of an exemplary computer network in which the inventive dynamic SRNG discovery technique may be used to optimize load-balancing of network traffic.

Using conventional "round robin" load-balancing protocols, PE4 would distribute network traffic addressed to the destination N equally among the three possible routes. That is, PE1, PE2 and PE3 would each receive ⅓ of the traffic. However, such a round-robin approach does not equally distribute traffic at CE1 and CE2, since CE1 would receive ⅔ of the traffic (⅓ from PE1 and ⅓ from PE2), whereas CE2 would only receive ⅓ of the traffic. More optimal load balancing may be realized when PE4 dynamically determines the SRNG memberships of PE1, PE2 and PE3, in accordance with the present invention. In this case, PE4 can automatically detect that PE1 and PE2 belong to the same SRNG, and thus may distribute network traffic in a manner that ensures that both CE1 and CE2 receive equal amounts of traffic addressed to the destination N (as shown).

In yet another illustrative application, the dynamic SRNG discovery technique of the present invention may be utilized when selecting a backup PE device for fast reroute (FRR) at the edge of a RFC-2547 network. An example of such a backup PE selection algorithm is described in U.S. patent application Ser. No. 11/084,838, entitled ALGORITHM FOR BACKUP PE SELECTION, filed Mar. 18, 2005, by Clarence Filsfils et al., which application is expressly incorporated by reference as though fully set forth herein. Accordingly, the value of a SRNG metric may be associated with at least some of the fully-meshed PE devices based on the results of the dynamic SRNG discovery technique described herein. Thereafter, the SRNG metrics may be input to an appropriate backup PE selection algorithm. Of course, those skilled in the art will appreciate that the dynamic SRNG system and method of the present invention also may be useful in other applications not explicitly described herein.

Advantageously, the inventive dynamic SRNG discovery technique enables faster and more efficient identification of SRNG memberships. The technique also enables SRNG memberships to be updated faster and more efficiently in response to network topology changes. For example, iBGP messages 160 containing updated CE-identifier information may be disseminated among the fully-meshed PE devices to quickly communicate changes in CE device reachability. In response to receiving such an update, a PE device can update the contents of its BGP table 300, thereby providing an up-to-date view of SRNG memberships in the provider network.

The foregoing has been a detailed description of illustrative embodiments of the invention. Various modifications and additions can be made without departing from the spirit and scope of the invention. For example, while the inventive dynamic SRNG discovery technique has been illustratively described with respect to MPLS/VPN networks, it is also expressly contemplated that the invention may be deployed in other types of networks and subnetworks, such as autonomous systems, broadcast domains, routing areas, etc., that implement various network communication protocols. Moreover, where the illustrative embodiments describe devices that are "attached," those skilled in the art will understand that the devices may be physically and/or logically coupled to one another, e.g., by BGP communication sessions or the like.

It is expressly contemplated that the teachings of this invention can be implemented as software, including a computer-readable medium having program instructions executing on a computer, hardware, firmware, or a combination thereof. For instance, the invention may be implemented by a PE device 200 having one or more processors, some of which may reside on the network interfaces 210 or on line cards containing the network interfaces. Further, the memory 240 may be distributed among a plurality of different memory elements, both local and remote to the PE device 200. The inventive technique therefore may be implemented in various combinations of hardware and/or software. Accordingly, this description is meant to be taken only by way of example and not to otherwise limit the scope of the invention.

What is claimed is:

1. A method for dynamically discovering shared risk node group (SRNG) membersips of a plurality of interconnected edge devices in a first routing domain, at least some of the plurality of interconnected edge devices being attached to peer devices located in a second routing domain, the method comprising:

determining, at a first edge device of the plurality of interconnected edge devices in the first routing domain, a first set of identities of each peer device in the second routing domain attached to the first edge device in the first routing domain;

receiving, in one or more advertisements from a second edge device of the plurality of interconnected edge devices in the first routing domain, at the first edge device, a second set of identities of each peer device in the second routing domain attached to the second edge device;

storing the first set of identities and the second set of identities in a table that includes a plurality of entries, wherein each entry of the plurality of entries associates an address prefixes reachable in the second routing domain, with an identity of a peer device in the second routing domain which advertised the address prefix and with one or more attached edge devices of the plurality of interconnected edge devices in the first routing domain that represent a next-hop for the address prefix;

determining a set of entries from the plurality of entries stored in the table by identifying entries with a same address prefix;

determining a subset of entries from the set of entries by identifying entries of the set of entries with a same identity of a peer device in the second routing domain;

identifying different edge devices of the plurality of interconnected edge devices in the first routing domain that are associated with each entry of the subset of entries as members of a SRNG, wherein the SRNG indicates that each edge device of the different edge devices would be impacted by a single failure; and using an edge device's membership in the SRNG in an application.

2. The method of claim 1, wherein the step of determining a first set of identities of each peer device in the second routing domain attached to the first edge device further comprises:

receiving, at the first edge device, a message transmitted from a directly-attached peer device in the second routing domain;

locating an identity of the directly-attached peer device in the second routing domain in a predetermined field of the received message.

3. The method of claim 2, wherein the message is a border gateway protocol (BGP) Open message and the predetermined field is a BGP Identifier field.

4. The method of claim 2, wherein the message is an interior gateway protocol (IGP) Hello message and the predetermined field is a Router ID field or a type-length-value tuple.

5. The method of claim 1, further comprising:

advertising, in response to determining a particular identity of a peer device in the second routing domain, the particular identity of the peer device from the first edge device to the second edge device in the first routing domain.

6. The method of claim 5, wherein the step of advertising further comprises:

storing the particular identity of the peer device in the second routing domain in a border gateway protocol (BGP) extended community attribute; and advertising the BGP extended community attribute in a BGP message sent from the first edge device to each of the plurality of interconnected edge devices in the first routing domain.

7. The method of claim 6, wherein the BGP extended community attribute is configured to store a single peer device identity of a peer device.

8. The method of claim 1, further comprising:

determining, for each peer device identity of a peer device in the second routing domain received from the second edge device in the first routing domain that the second edge device advertised the peer device identity of the peer device.

9. The method of claim 8, further comprising:

receiving, for each peer device identity of a peer device in the second routing domain received from the second edge device in the first routing domain, a border gateway protocol (BGP) next-hop attribute that identifies that the second edge device advertised the peer device identity of the peer device.

10. The method of claim 1, wherein the using an edge device's membership in SRNG further comprises:

load balancing network traffic in the computer network based on the SRNG.

11. The method of claim 1, wherein the using an edge device's membership in the SRNG further comprises:

determining SRNG metric values for at least one of the plurality of interconnected edge devices in the first routing domain based on the SRNG; and inputting the SRNG metric values into a backup-edge device selection algorithm deployed in the first routing domain.

12. The method of claim 1, wherein each of the one or more advertisements is a border gateway protocol (BGP) message, and the table is a BGP table.

13. A network node configured to dynamically discover shared risk node group (SRNG) memberships of a plurality of edge devices in a first routing domain, at least some of the plurality of edge devices being attached to peer devices located in a second routing domain, the network node comprising:

means for determining a first set of identities of each peer device in the second routing domain attached to a first edge device in the first routing domain;

means for receiving, in one or more advertisements from an edge device of the plurality of edge devices in the first routing domain, a second set of identities of each peer device in the second routing domain attached to the edge device;

means for storing the first set of identities and the second set of received identities of each peer device in a table that includes a plurality of entries, wherein each entry of the plurality of entries associates an address prefix reachable in the second routing domain, with an identity of a peer device in the second routing domain which advertised the address prefix and with one or more attached edge devices of the plurality of edge devices in the first routing domain that represent a next-hop for the address prefix; and means for determining a set of entries from the plurality of entries stored in the table by identifying entries with a same address prefix;

means for determining a subset of entries from the set of entries by identifying entries of the set of entries with a same identity of a peer device in the second routing domain;

means for identifying different edge devices of the plurality of edge devices in the first routing domain that are associated with each entry of the subset of entries as members of a SRNG wherein the SRNG indicates that each edge device of the different edge devices would be impacted by a single failure.

14. The network node of claim 13, further comprising:
means for determining, for each identity of a peer device in the second routing domain received from the edge device in the first routing domain which edge device advertised the identity of the peer device.

15. A first edge device configured to dynamically discover shared risk node group (SRNG) memberships of a plurality of edge devices in a first routing domain, at least some of the plurality of edge devices being attached to peer devices located in a second routing domain, the first edge device comprising:
a processor;
a first set of one or more network interfaces coupled to the plurality of edge devices in the first routing domain, the first set of one or more network interfaces being configured to receive, in one or more advertisements from a second edge device of the plurality of edge devices, a first set of identities of each peer device in the second routing domain attached to the second edge device of the plurality of edge devices; and
a second set of one or more network interfaces coupled to at least one peer device in the second routing domain; and
a memory configured to store instructions which are executable by the processor to:
determine a second set of identities of each peer device coupled to the second set of network interfaces,
store the first set of received identities and the second set of identities of each peer device in a data structure that includes a plurality of entries, wherein each entry of the plurality of entries associates an address prefix reachable in the second routing domain with an identity of a peer-device in the second routing domain which advertised the address prefix and with one or more attached edge devices of the plurality of edge device in the first routing domain that represent a next-hop for the address prefix,
determine a set of entries of the plurality of entries stored in the table by identifying entries with a same address prefix,
determine a subset of entries from the set of entries by identifying entries of the set of entries with a same identity of a peer device in the second routing domain,
identify different edge devices of the plurality of edge devices in the first routing domain that are associated with each entry of the subset of entries as a SRNG, wherein the SRNG indicates that each device of the different edge devices would be impacted by a single failure, the instructions further executable by the processor to use an edge device's membership in the SRNG in an application.

16. The first edge device of claim 15, wherein the second set of network interfaces is configured to receive a message from a directly-attached peer device, and
the memory is further configured to store instructions for locating an identity of the directly-attached peer device in the second routing domain in a predetermined field of the received message.

17. The first edge device of claim 15, wherein the memory is further configured to store instructions for:
advertising, in response to determining a particular identity of a peer device in the second routing domain, the particular identity of the peer device to the plurality of edge devices in the first routing domain coupled to the first set of network interfaces.

18. The first edge device of claim 17, wherein the memory is further configured to store instructions for:
storing the particular identity of the peer device in a border gateway protocol (BGP) extended community attribute; and
advertising the BGP extended community attribute in a BGP message sent to the plurality of edge devices in the first routing domain coupled to the first set of network interfaces.

19. The first edge device of claim 15, wherein the memory is further configured to store instructions for:
determining, for each identity of a peer device in the second routing domain received at the second set of network interfaces, which edge device in the first routing domain advertised the identity of the peer device.

20. A computer network, comprising:
a plurality of edge devices in a first routing domain;
one or more peer devices in a second routing domain attached to the plurality of edge devices in the first routing domain;
a network node coupled to the plurality of edge devices in the first routing domain, the network node being configured to:
determine, for a first edge device of the plurality of edge devices in the first routing domain, a first set of identities of each peer device in the second routing domain attached to the first edge device in the first routing domain;
receive, in an extended community attribute of one or more advertisements from a second edge device of the plurality of edge devices in the first routing domain, a second set of identities of peer devices in the second routing domain attached to the plurality of edge devices in the first routing domain;
store the first set of identities and the second set of identities in a table that includes a plurality of entries, wherein each entry of the plurality of entries associates an address prefix reachable in the second routing domain with an identity of peer device in the second routing domain, which advertised the address prefix and with one or more attached edge devices of the plurality of edge devices in the first routing domain that represent a next-hop for the address prefix;
determine a set of entries from the plurality of entries store in the table by identifying entries with a same address prefix;
determine a subset of entries from the set of entries by identifying entries of the set of entries with a same identity of a peer device in the second routing domain;
identify different edge devices of the plurality of edge devices in the first routing domain that are associated with each entry of the subset of entries as members of a SRNG, wherein the SRNG indicates that each device of the different edge devices would be impacted by a single failure; and
use and edge device's member in the SRNG in an application.

21. The computer network of claim 20, wherein each of the one or more advertisements is a border gateway protocol (BGP) message, and the table is a BGP table.

22. A non-transitory computer-readable medium storing instructions for execution on processor for the practice of a method of dynamically discovering shared risk node group (SRNG) memberships of a plurality of interconnected edge devices in a first routing domain, at least some of the edge devices being attached to peer devices located in a second routing domain, the method comprising:

determining a first set of identities of each peer in the second routing domain attached to a first edge device in the first rouging domain;

receiving, in an extended community attribute of one or more advertisements from a second edge device of the plurality of interconnected edge devices, at the first edge device, a second set of identities of each peer device in the second routing domain attached to the second edge device;

storing the first set of identities and the second set of identities in a data structure that includes a plurality of entries, wherein each entry of the plurality of entries associates an address prefix reachable in the second routing domain with an identity of a peer device in the second routing domain which advertised the address prefix and with one or more attached edge devices of the plurality of edge devices in the first routing domain that represent a next-hop for the address prefix;

determining a set of entries from the plurality of entries stored in the table by identifying entries with a same address prefix;

determining a subset of entries from the set of entries by identifying entries of the set of entries with a same identity of a peer device in the second routing domain;

identifying different edge devices of the plurality of edge devices in the first routing domain that are associated with each entry of the subset of entries as members of a SRNG, wherein the SRNG indicates that each edge device in a group of two or more edge devices would be impacted by a single failure; and using an edge device's membership in the SRNG in an application.

\* \* \* \* \*

UNITED STATES PATENT AND TRADEMARK OFFICE
CERTIFICATE OF CORRECTION

PATENT NO. : 8,228,786 B2
APPLICATION NO. : 11/101134
DATED : July 24, 2012
INVENTOR(S) : Jean-Philippe Vasseur et al.

It is certified that error appears in the above-identified patent and that said Letters Patent is hereby corrected as shown below:

Col. 8, line 27 should read: "~~IBGP~~ iBGP and/or eBGP. The BGP process manages the contents"

Col. 10, line 36 should read: "described with respect to ~~MPLSJVPN~~ MPLS/VPN networks, it is also"

Col. 10, line 61 should read: "group (SRNG) ~~membersips~~ memberships of a plurality of interconnected"

Col. 10, line 63 should read: "~~plurality of interconnected~~ edge devices being attached to"

Col. 14, line 56-57 should read: "use ~~and~~ an edge device's ~~member~~ membership in the SRNG in an application."

Col. 15, line 1 should read: "determining a first set of identities of each peer device in the"

Col. 15, line 3 should read: "the first ~~rouging~~ routing domain;"

Signed and Sealed this
Twenty-fifth Day of September, 2012

David J. Kappos
*Director of the United States Patent and Trademark Office*